(12) United States Patent
Ryu et al.

(10) Patent No.: US 9,292,238 B2
(45) Date of Patent: Mar. 22, 2016

(54) METHOD AND APPARATUS FOR PREVENTING LEAKAGE OF PRINTOUT USING SECURITY PAPER

(71) Applicant: ELECTRONICS AND TELECOMMUNICATIONS RESEARCH INSTITUTE, Daejeon (KR)

(72) Inventors: Seung jin Ryu, Daejeon (KR); Min sik Kim, Daejeon (KR); Han jun Yoon, Daejeon (KR); Do hoon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/458,460

(22) Filed: Aug. 13, 2014

(65) Prior Publication Data

US 2016/0011829 A1 Jan. 14, 2016

(30) Foreign Application Priority Data

Jul. 10, 2014 (KR) ........................ 10-2014-0086903

(51) Int. Cl.
*G06F 21/10* (2013.01)
*G06F 3/12* (2006.01)
(Continued)

(52) U.S. Cl.
CPC .............. *G06F 3/1222* (2013.01); *B42D 25/29* (2014.10); *G06F 3/1238* (2013.01); *G06F 21/608* (2013.01); *G06F 21/64* (2013.01); *G06Q 99/00* (2013.01); *G07D 7/20* (2013.01)

(58) Field of Classification Search
None
See application file for complete search history.

(56) References Cited

U.S. PATENT DOCUMENTS

2005/0038756 A1 2/2005 Nagel
2008/0117461 A1* 5/2008 Mitsutake et al. ........... 358/1.16
(Continued)

FOREIGN PATENT DOCUMENTS

JP 2004236069 * 8/2004
JP 2012-150348 A 8/2012
(Continued)

OTHER PUBLICATIONS

English machine translation of JP2004-236069 to Miyamoto Hirohisa.*

(Continued)

*Primary Examiner* — Benny Q Tieu
*Assistant Examiner* — Haris Sabah
(74) *Attorney, Agent, or Firm* — LRK Patent Law Firm

(57) ABSTRACT

A method for preventing leakage of a printout using security paper includes registering, by an export registration device, information about a printout of an electronic document by generating the information about the printout and transmitting the information about the printout to an export management server, outputting, by a security printer, a security printout by printing content and a security identifier of the electronic document on paper including a security substance, and determining whether or not to export the security printout, by a leakage detection device, by inspecting whether or not the security printout includes the security substance and detecting the security identifier. The security identifier includes security information about the printout of the electronic document, and the information about the printout of the electronic document includes information about a unique value allowing the printout to be uniquely identified.

12 Claims, 9 Drawing Sheets

(51) Int. Cl.

| | | |
|---|---|---|
| *G06F 21/60* | (2013.01) | |
| *G06F 21/64* | (2013.01) | |
| *G06Q 99/00* | (2006.01) | |
| *G07D 7/20* | (2006.01) | |
| *B42D 25/29* | (2014.01) | |

(56) References Cited

U.S. PATENT DOCUMENTS

| | | | |
|---|---|---|---|
| 2009/0026261 A1 | 1/2009 | Inoue et al. | |
| 2011/0007348 A1* | 1/2011 | Yamaizumi | 358/1.15 |
| 2011/0309910 A1 | 12/2011 | Lee | |
| 2013/0016375 A1* | 1/2013 | Hashidume et al. | 358/1.9 |
| 2013/0016376 A1* | 1/2013 | Hashidume et al. | 358/1.9 |
| 2013/0262333 A1* | 10/2013 | Wicker et al. | 705/325 |

FOREIGN PATENT DOCUMENTS

| | | |
|---|---|---|
| KR | 10-2008-0107977 A | 12/2008 |
| KR | 10-0933175 B1 | 12/2009 |
| KR | 10-2011-0126953 A | 11/2011 |
| WO | 2008/150133 A2 | 12/2008 |

OTHER PUBLICATIONS

Machine translation of JP PUB 2004-236069 to Miyamoto Hirohisa.*

J. A. Briffa et al, "Imperceptible Printer Dot Watermarking for Binary Documents," Proc. of SPIE7723, Optics, Photonics, and Digital Technologies for Multimedia Applications, 2010.

\* cited by examiner

METHOD AND APPARATUS FOR PREVENTING LEAKAGE OF PRINTOUT USING SECURITY PAPER

CROSS REFERENCE TO RELATED APPLICATION

This application claims the benefit of Korean Patent Application No. 10-2014-0086903, filed Jul. 10, 2014, which is hereby incorporated by reference in its entirety into this application.

BACKGROUND OF THE INVENTION

1. Technical Field

The present invention relates generally to a method and apparatus for preventing illegal leakage of a printout of an electronic document and, more particularly, to a method and apparatus for preventing illegal leakage of a printout by outputting the content and security identifier of an electronic document on paper including a security substance, sensing the security substance, and recognizing the content of the security identifier.

2. Description of the Related Art

With improvement in technology of enterprises, the leakage of advanced industrial technology has steadily increased. Such a technology leakage is mostly caused by an insider who intelligently abuses holes in an already deployed security system. Therefore, a technology for preventing external leakage of output confidential documents and drawings is necessary.

Conventional technologies for preventing leakage of a printout have proposed the use of security printing paper. For example, in Korean Patent Application Publication No. 10-2008-0107977 entitled "Security Printing Paper and Method for Manufacturing the Same", a detection tag is inserted into printing paper such that the detection tag can be sensed when a printout, which is output on the printing paper, passes through a detection gateway. However, it is difficult to detect a person who actually outputs the printout, and it is also difficult to distinguish between a case in which the printout should be exported and a case in which the printout should not be exported.

Another technology disclosed in Korean Patent Application Publication No. 10-2011-0126953 entitled "Apparatus and Method for Supplementing Distribution of Internal Document" provides a method of tracing the illegal use of an original internal document by inserting a watermark into the original internal document. However, it is difficult to detect external export of the internal document into which the watermark is inserted.

Such a conventional technology for preventing leakage of a printout has limits in approving export, preventing leakage, and recording relevant information depending on whether or not the external export of an actual printout is permitted.

SUMMARY OF THE INVENTION

Accordingly, the present invention has been made keeping in mind the above problems occurring in the prior art, and an object of the present invention is to provide a method, apparatus, and system for approving export of a printout, preventing leakage of the printout, and recording relevant information depending on whether or not the external export of the printout is permitted.

Another object of the present invention is to provide a method, apparatus, and system for registering the external export of a printout.

A further object of the present invention is to provide a method, apparatus, and system for generating a security printout by outputting the content and security identifier of an electronic document on paper including a security substance.

A still further object of the present invention is to provide a method, apparatus, and system for detecting a security substance and a security identifier from a security printout.

Other objects of the present invention will be easily understood through description of embodiments below.

In accordance with an aspect of the present invention to accomplish the above objects, there is provided a method for preventing leakage of a printout using security paper, including registering, by an export registration device, information about a printout of an electronic document by generating the information about the printout and transmitting the information about the printout to an export management server; outputting, by a security printer, a security printout by printing content and a security identifier of the electronic document on paper including a security substance; and determining whether or not to export the security printout, by a leakage detection device, by inspecting whether or not the security printout includes the security substance and detecting the security identifier, wherein the security identifier includes security information about the printout of the electronic document, and the information about the printout of the electronic document includes information about a unique value allowing the printout to be uniquely identified.

Registering may include generating the unique value allowing the electronic document to be uniquely identified; transmitting information about the printout including the unique value to the export management server; and registering, by the export management server, the information about the printout.

Outputting may include inspecting, by the security printer, whether the paper including the security substance, is provided; printing the content of the electronic document on the paper including the security substance; and printing the security identifier of the electronic document on the paper including the security substance.

Printing the security identifier of the electronic document may include calculating the information about the printout of the electronic document and the unique value allowing the electronic document to be distinguished; generating the security identifier corresponding to the unique value; and printing and outputting the security identifier.

Inspecting may include determining, by the leakage detection device, whether or not the security printout includes the security substance; generating, by the leakage detection device, an export warning when the security substance is detected; transmitting, by the leakage detection device, an export recognition request, which includes the information about the printout acquired by detecting the security identifier printed on the security printout and analyzing the detected security identifier, to the export management server; generating, by the export management server, export information by comparing the stored information about the printout with the export recognition request; and determining, by the leakage detection device, whether or not to export the security printout by receiving and analyzing the export information, wherein the security identifier includes the information about the security printout and the unique value of the electronic document.

The method may further include recording, by the export management server, information about the printout and the unique value.

The paper including the security substance may include different security substances according to a security level.

In accordance with another aspect of the present invention to accomplish the above objects, there is an apparatus for preventing leakage of a printout using security paper, including an export registration unit for registering information about a printout of an electronic document by generating the information about the printout and transmitting the information about the printout to an export management server; a security printer unit for generating a security printout by printing content and a security identifier of the electronic document using paper including a security substance; an export management server unit for recording and determining whether the security printout is to be exported to outside; and a leakage detection unit for determining whether or not to export the security printout by detecting the security substance of the security printout, generating an export warning, and analyzing the security identifier, wherein the security identifier includes information about the printout of the electronic document, the information about the printout of the electronic document includes information about a unique value allowing the printout to be uniquely identified.

The export registration unit may include a printout unique value calculation unit for calculating and generating the unique value of the electronic document; and a printout information transmission unit for transmitting information about the printout of the electronic document and the unique value of the electronic document to the export management server unit.

The export management server unit may include a printout export occurrence/non-occurrence previous registration unit for recording information about the printout which may be exported to outside by receiving and analyzing the information about the printout and the unique value of the electronic document; and a printout export information post recording unit for receiving occurrence/non-occurrence of an attempt of export of the security printout from the leakage detection unit, recording the occurrence/non-occurrence of the attempt of export of the security printout, and generating, recording, and transmitting export information including information about approval/non-approval of export of the security printout at a request of the leakage detection unit.

The security printer unit may include a security paper inspection unit for inspecting whether or not paper including the security substance is provided; an electronic document output unit for outputting the content of the electronic document; and a security identifier insertion unit for printing the security identifier on the security printout.

The security identifier insertion unit may include a printout unique value calculation unit for calculating the unique value of the electronic document by analyzing the electronic document; a security identifier generation unit for generating the security identifier which includes the unique value and information about the printout of the electronic document in a form of low perception; and a security identifier output unit for printing the security identifier on the security printout.

The leakage detection unit may include a security substance detection unit for detecting the security substance of the security printout; and a security identifier detection unit for detecting and analyzing the security identifier of the security printout, transmitting the security identifier to the export management server unit, and determining whether or not to approve the export by analyzing the export information received from the export management server unit.

The security identifier detection unit may include a security identifier extraction unit for extracting the security identifier printed on the security printout, and correcting distortion and errors of the extracted security identifier; a printout information extraction unit for extracting information about the printout of the electronic document and the unique value of the electronic document from the extracted security identifier; an export information acquisition unit for transmitting the information about the printout of the electronic document and the unique value of the electronic document to the export management unit, and receiving export information from the export management unit; and an export approval determination unit for analyzing the acquired export information, permitting export when the printout is permitted to be exported and rejecting export when the printout is not permitted to be exported.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention may be variously changed and may have various embodiments, and specific embodiments will be described in detail below with reference to the attached drawings. However, it should be understood that those embodiments are not intended to limit the present invention to specific embodiments and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context.

Hereinafter, embodiments of the present invention will be described in detail with reference to the accompanying drawings.

Figure 1:
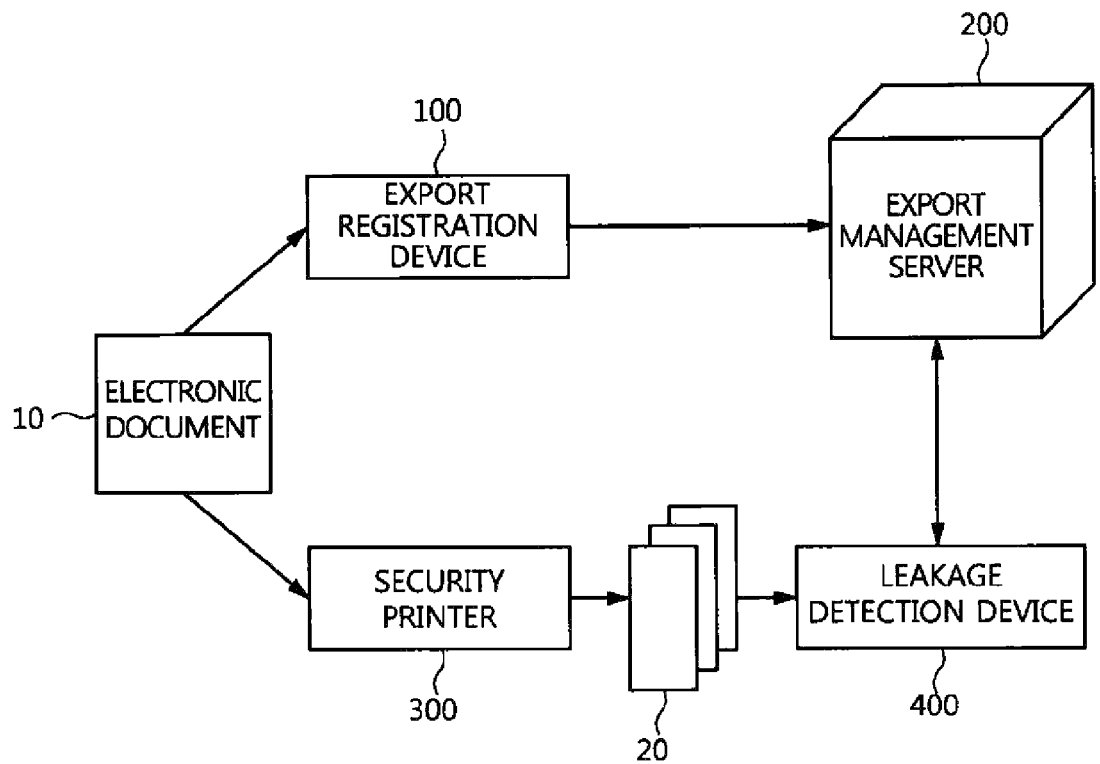
FIG. 1 is a diagram illustrating the configuration of an apparatus for preventing leakage of a printout using security paper according to an embodiment of the present invention.

FIG. 1 is a diagram illustrating the configuration of an apparatus for preventing leakage of a printout using security paper according to an embodiment of the present invention.

The apparatus for preventing leakage of a printout using security paper according to the present invention includes an export registration unit, an export management server unit, a security printing unit, and a leakage detection unit.

The apparatus for preventing leakage of a printout using security paper according to the present invention may be an apparatus including the entire export registration unit, the export management server unit, the security printing unit, and the leakage detection, and each of the component units may be a separate device.

Here, the export registration unit may be an export registration device 100, the export management server unit may be an export management server 200, the security printing unit may be a security printer 300, and the leakage detection unit may be a leakage detection device 400.

Hereinafter, for convenience of explanation, description will be made on the assumption that the export registration unit is the export registration device 100, the export management server unit is the export management server 200, the security printing unit is the security printer 300, and the leakage detection unit is the leakage detection device 400.

Referring to FIG. 1, the occurrence/non-occurrence of export of a printout, acquired by outputting an electronic document 10, is registered in the export management server 200 through the export registration device 100. Thereafter, a security printout 20 is generated in such a way that the electronic document 10 is output through the security printer 300. When the external export of the security printout 20 is attempted, the leakage detection device 400 determines whether or not to perform external export of the security printout 20.

When an electronic document, the export approval information of which is not recorded in the export management server 200, is output through the security printer 300 and the external export of the printout is attempted, the leakage detection device 400 senses and blocks such an illegal export attempt.

Figure 2:
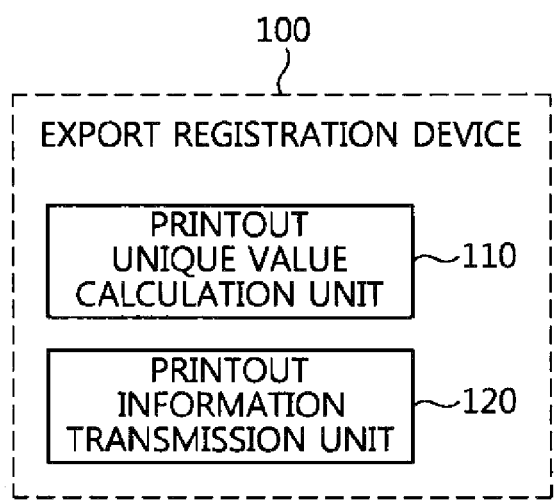
FIG. 2 is a diagram illustrating the configuration of an export registration device according to the embodiment of the present invention.

FIG. 2 is a diagram illustrating the configuration of the export registration device according to the embodiment of the present invention.

The export registration device 100 generates information about the printout of the electronic document 10, and transmits the information to the export management server such that the approval/non-approval of the export of the security printout 20 is registered.

For this, the export registration device 100 includes a printout unique value calculation unit 110 and a printout information transmission unit 120.

The printout unique value calculation unit 110 calculates and generates the unique value of the electronic document 10.

Here, the unique value means information allowing the electronic document 10 to be uniquely identified. For example, the unique value may include a hash value for the electronic document 10.

The printout information transmission unit 120 transmits the information about the printout of the electronic document 10 and the unique value of the electronic document 10 to the printout export occurrence/non-occurrence previous registration unit 210 of the export management server 200.

Figure 3:
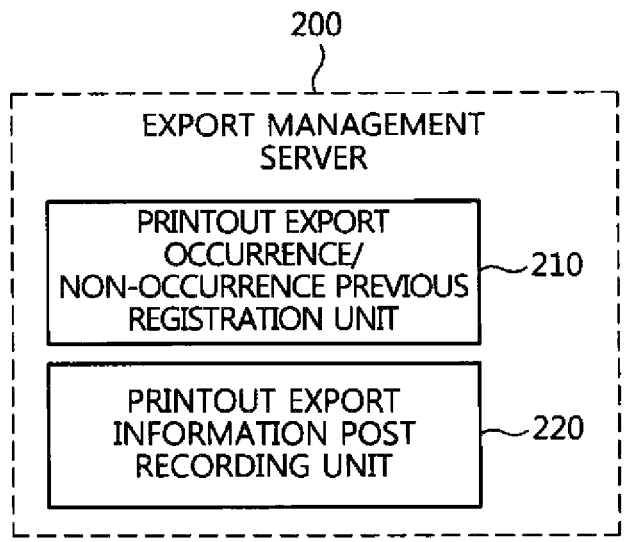
FIG. 3 is a diagram illustrating the configuration of an export management server according to the embodiment of the present invention.

FIG. 3 is a diagram illustrating the configuration of the export management server according to the embodiment of the present invention.

The export management server 200 according to the present invention performs functions of determining the occurrence/non-occurrence of external export of the security printout 20 and recording the occurrence/non-occurrence of external export of the security printout 20.

For this, the export management server 200 includes the printout export occurrence/non-occurrence previous registration unit 210 and a printout export information post recording unit 220.

The printout export occurrence/non-occurrence previous registration unit 210 receives the information about the printout of the electronic document 10 and the unique value of the electronic document 10 from the export registration device 100, analyzes the printout information and the unique value, and records information about the security printout 20 which may be externally exported.

The printout export information post recording unit 220 receives the printout information from the export occurrence/non-occurrence acquisition unit 423 of the security identifier detection unit 420 of the leakage detection device 400, records the occurrence/non-occurrence of export attempt for the security printout 20 corresponding to the printout information, generates export information by determining whether or not the security printout 20 is permitted to be exported, and transmits the export information to the export occurrence/non-occurrence acquisition unit 423.

Here, the printout information means all information about the electronic document 10. That is, the printout information includes information about the title of the electronic document, the content of the electronic document, a date on which the electronic document is written, a writer of the electronic document, the security level of the electronic document, and the occurrence/non-occurrence of export of the electronic document.

Here, the export information is information indicative of whether or not export of the security printout 20 currently being attempted to be exported is approved, and includes information indicative of an exportable printout or a non-exportable printout.

Figure 4:
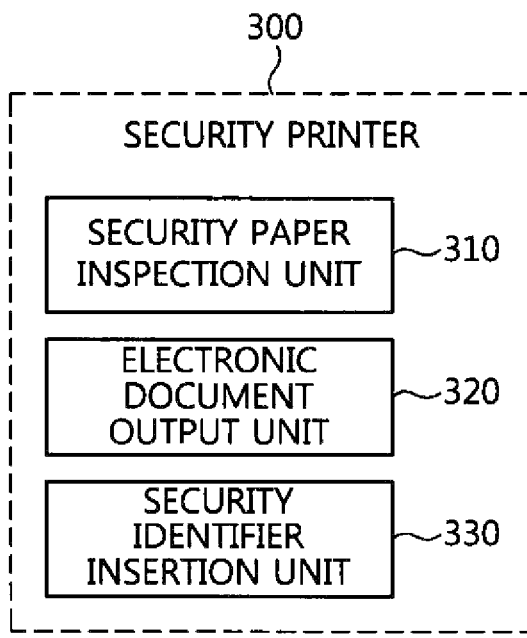
FIG. 4 is a diagram illustrating the configuration of a security printer according to the embodiment of the present invention.

FIG. 4 is a diagram illustrating the configuration of the security printer according to the embodiment of the present invention.

The security printer 300 according to the present invention generates the security printout 20 by printing the content and security identifier of the electronic document 10 on paper including a security substance.

For this, the security printer 300 includes a security paper inspection unit 310, an electronic document output unit 320, and a security identifier insertion unit 330.

The security paper inspection unit 310 inspects whether or not security paper is provided in the security printer 300, and restricts outputting the electronic document when the paper is not security paper.

Here, different types of paper which respectively include different security substances may be used according to a security level.

That is, the security printout 20 may be generated using pieces of paper including respectively different security substances according to the security level of the electronic document 10.

In this case, the leakage detection device 400 may be immediately aware of the security level of the relevant security printout 20 based on a detected security substance.

The electronic document output unit 320 performs a function of outputting the content of the received electronic document 10.

The security identifier insertion unit 330 performs functions of converting the printout information into a form of a security identifier with low perception using a cognitive visual system, and printing the security identifier on the security printout 20.

The security identifier insertion unit 330 will be described later in further detail with reference to FIG. 5.

Figure 5:
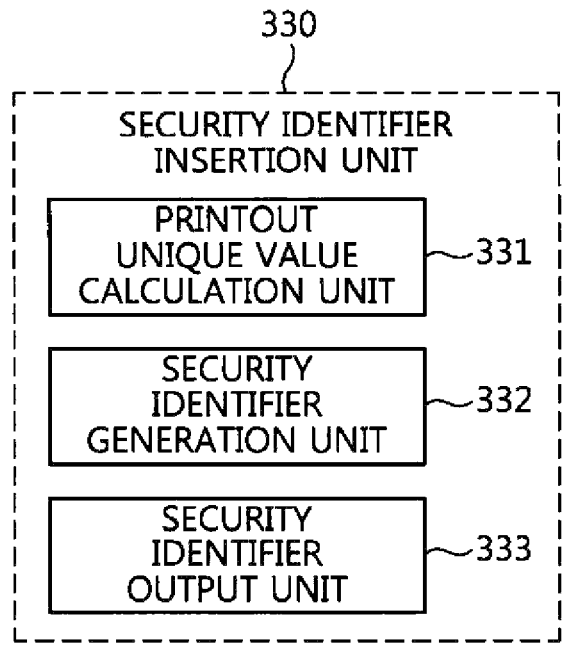
FIG. 5 is a diagram illustrating the configuration of a security identifier insertion unit according to the embodiment of the present invention.

FIG. 5 is a diagram illustrating the configuration of the security identifier insertion unit according to the embodiment of the present invention.

The security identifier insertion unit 330 includes a printout unique value calculation unit 331, a security identifier generation unit 332, and a security identifier output unit 333.

The printout unique value calculation unit 331 calculates a unique value allowing the electronic document 10 given as the input to be uniquely identified. The unique value may include a hash value for the electronic document 10.

The security identifier generation unit 332 performs a function of generating the security identifier by converting the unique value and the printout information into a form of the security identifier with low perception using the cognitive visual system. The security identifier may include robustness for a process of rotation, enlargement, reduction, movement, transparency, noise-addition, partial-loss, and printing and scanning.

The security identifier output unit 333 performs a function of outputting the generated security identifier throughout the entire printout. Alternatively, the security identifier may be printed out as the background of security printout.

Here, the size of the security identifier may be smaller than the size of the printout, and a plurality of security identifiers may be output in the form of tiles.

Figure 6:
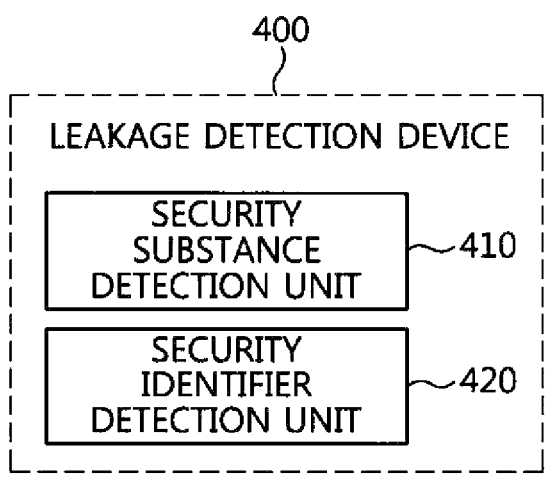
FIG. 6 is a diagram illustrating the configuration of a leakage detection device according to the embodiment of the present invention.

FIG. 6 is a diagram illustrating the configuration of the leakage detection device according to the embodiment of the present invention The leakage detection device 400 according to the invention detects the security substance of the security printout, generates a warning against export, and determines whether or not to export the security printout.

For this, the leakage detection device 400 includes a security substance detection unit 410 and a security identifier detection unit 420.

The security substance detection unit 410 may have a form of a gateway for inspecting items to be exported, and senses the security substance inserted into the security printout 20. If the security substance is sensed, a warning sound may be generated.

The security identifier detection unit 420 detects and analyzes the security identifier of the security printout 20, transmits the security identifier to the export management server 200, and determines whether or not to approve export by analyzing the export information received from the export management server 200.

The security identifier detection unit 420 will be described in detail below with reference to FIG. 7.

Figure 7:
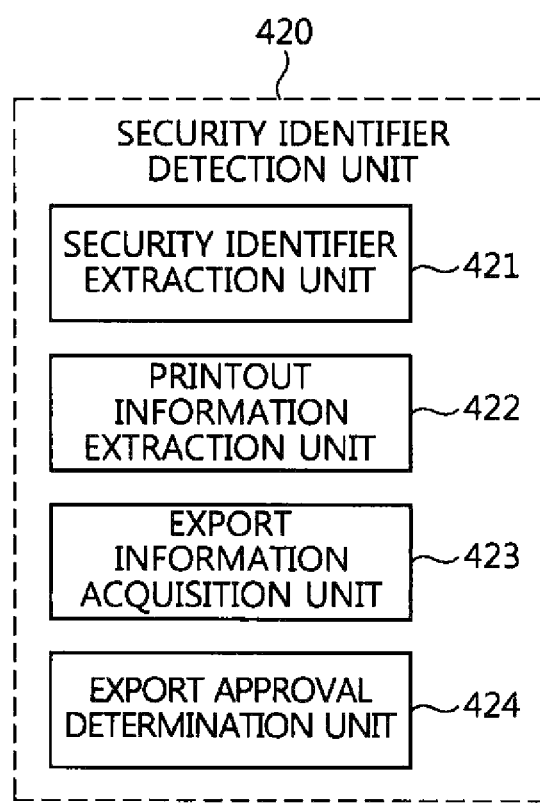
FIG. 7 is a diagram illustrating the configuration of a security identifier detection unit according to the embodiment of the present invention.

FIG. 7 is a diagram illustrating the configuration of the security identifier detection unit according to the embodiment of the present invention.

The security identifier detection unit 420 includes a security identifier extraction unit 421, a printout information extraction unit 422, an export information acquisition unit 423, and an export approval determination unit 424.

The security identifier extraction unit 421 performs functions of extracting only the security identifier of the content and the security identifier which are written in the security printout 20, and correcting the distortion and errors of the extracted security identifier.

The printout information extraction unit 422 performs a function of extracting the information about the printout and the unique value of the printout from the extracted security identifier.

The export occurrence/non-occurrence acquisition unit 423 performs functions of transmitting the extracted printout information and the unique value of the printout to the printout export information post recording unit 220 of the export management server 200, and acquiring the approval/non-approval of export of the printout from the printout export information post recording unit 220.

The export approval determination unit 424 performs functions of analyzing the acquired export information, permitting export when the printout is approved to be exported and rejecting export when the printout is not approved to be exported, based on the approval/non-approval of export.

Here, when export is approved or rejected, a unique warning sound or alarm may be generated such that security personnel can be informed of the approval or rejection.

Figure 8:
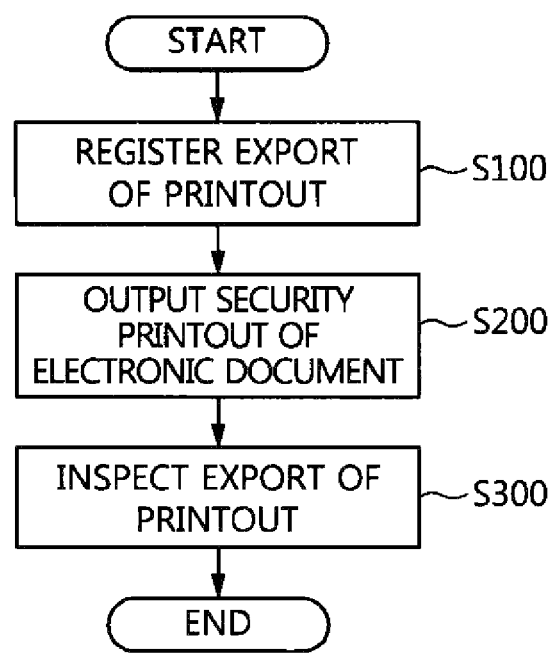
FIG. 8 is a flowchart illustrating a method for preventing leakage of a printout using security paper according to another embodiment of the present invention.

FIG. 8 is a flowchart illustrating a method for preventing leakage of a printout using security paper according to another embodiment of the present invention.

The export registration device 100 registers information about a printout of the electronic document 10 by generating the printout information and transmitting the printout information to the export management server 200 at export registration step S100.

The security printer 300 outputs the security printout 20 by printing the content and security identifier of the electronic document on paper including a security substance at security printout output step S200.

The leakage detection device 400 determines whether or not to export the security printout 20 by inspecting whether or not the security substance is present in the security printout 20 and detecting the security identifier at printout export inspection step S300.

Figure 9:
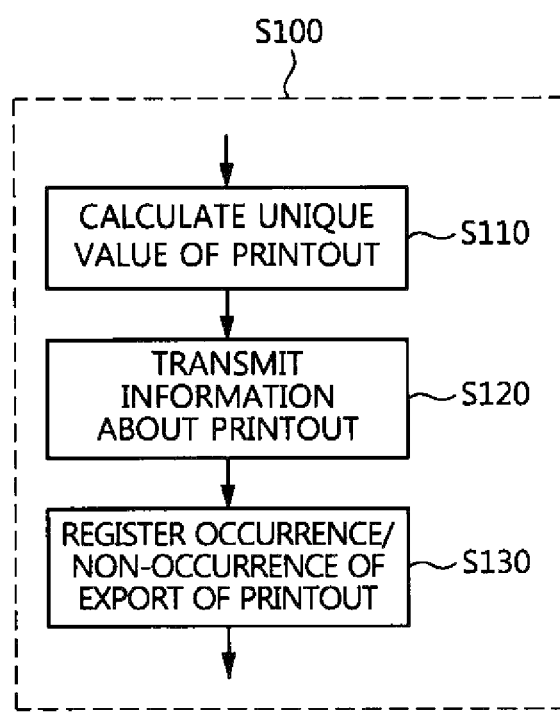
FIG. 9 is a flowchart illustrating the step of registering of an electronic document, which will be permitted to be exported to the outside, in the form of a printout according to the embodiment of the present invention.

FIG. 9 is a flowchart illustrating the step of registering an electronic document, which will be permitted to be exported to the outside, in the form of the printout according to the embodiment of the present invention.

At printout unique value calculation step S110, the printout unique value calculation unit 110 of the export registration device 100 calculates a unique value allowing the electronic document given as an input to be uniquely identified. Thereafter, at printout information transmission step S120, the printout information and the unique value are transmitted to the printout export occurrence/non-occurrence previous registration unit 210 of the export management server 200 by the printout information transmission unit 120 of the export registration device 100.

Thereafter, at printout export occurrence/non-occurrence previous registration step S130, the printout export occurrence/non-occurrence previous registration unit 210 of the export management server 200 records the received printout information and the unique value.

Figure 10:
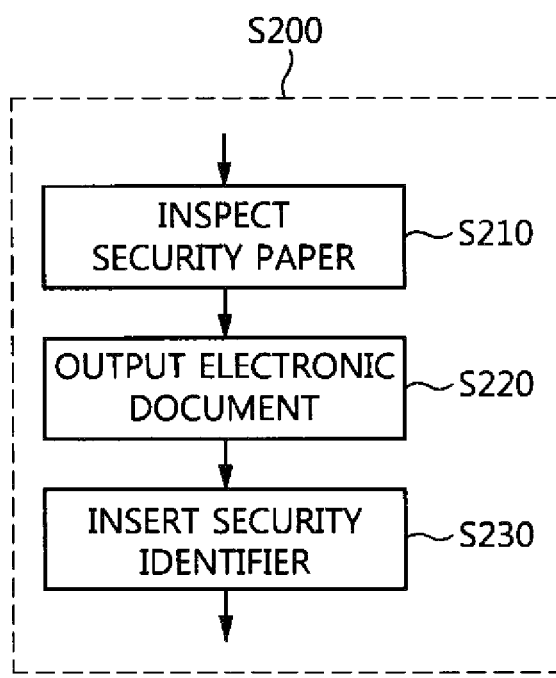
FIG. 10 is a flowchart illustrating a security printout output step according to the embodiment of the present invention.

FIG. 10 is a flowchart illustrating the security printout output step according to the embodiment of the present invention.

At security printout output step S200, the security printout is output by inspecting whether or not the paper is security paper at step S210, outputting the content of the electronic document at step S220, and inserting the security identifier at step S230.

Figure 11:
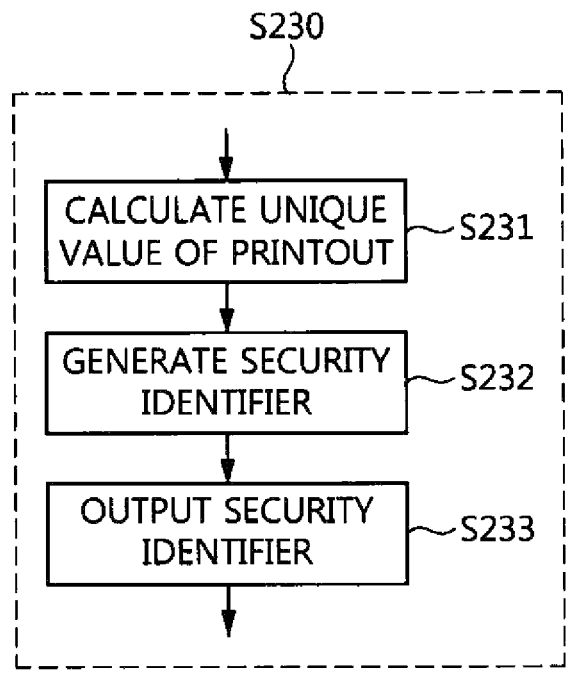
FIG. 11 is a flowchart illustrating security identifier insertion step S230 shown in FIG. 10 in detail.

FIG. 11 is a flowchart illustrating security identifier insertion step S230 shown in FIG. 10 in detail.

At the printout unique value calculation step S231 of security identifier insertion step S230, the printout unique value calculation unit 331 of the security identifier insertion unit 330 calculates the unique value allowing the electronic document 10 given as an input to be uniquely identified. The unique value may include a hash value for the electronic document.

Thereafter, at security identifier generation step S232, the security identifier is generated after converting the unique value and the printout information into a form of the security identifier with low perception using the cognitive visual system. The security identifier is configured in a form which may include robustness for a process of rotation, enlargement, reduction, movement, transparency, noise-addition, partial-loss, and printing and scanning.

Subsequently, at security identifier output step S233, the generated security identifier is printed as a whole or the background of the printout. Here, the size of the security identifier may be smaller than the size of the printout, and a plurality of security identifiers may be output in the form of tiles.

Figure 12:
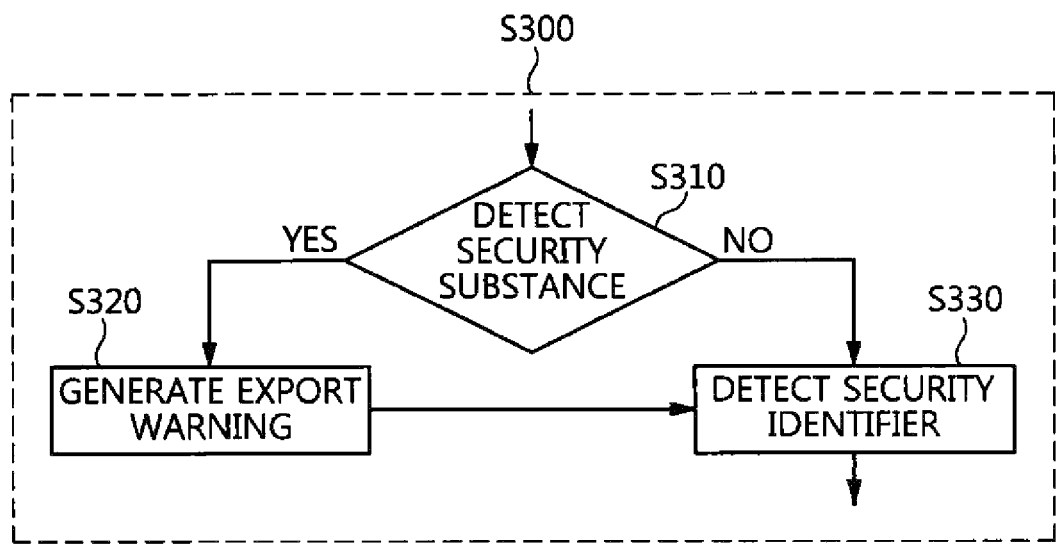
FIG. 12 is a flowchart illustrating step S300 in FIG. 8 in detail according to the embodiment of the present invention.

FIG. 12 is a flowchart illustrating step S300 of FIG. 8 according to the embodiment of the present invention in further detail.

At printout export inspection step S300 according to the embodiment of the present invention, it is determined whether or not export is approved by detecting the security printout 20 when the security printout 20 is being attempted to be exported. That is, the security substance of the printout which is being attempted to be exported is detected at step S310, a warning is generated when the security substance is detected at step S320, and the detection of the security identifier is induced at step S330. When a person who tries to export the security printout 20 does not pass through the security substance detection unit 410 with the security printout 20, the detection of the security identifier for the security printout 20 may be additionally performed at step S330.

Figure 13:
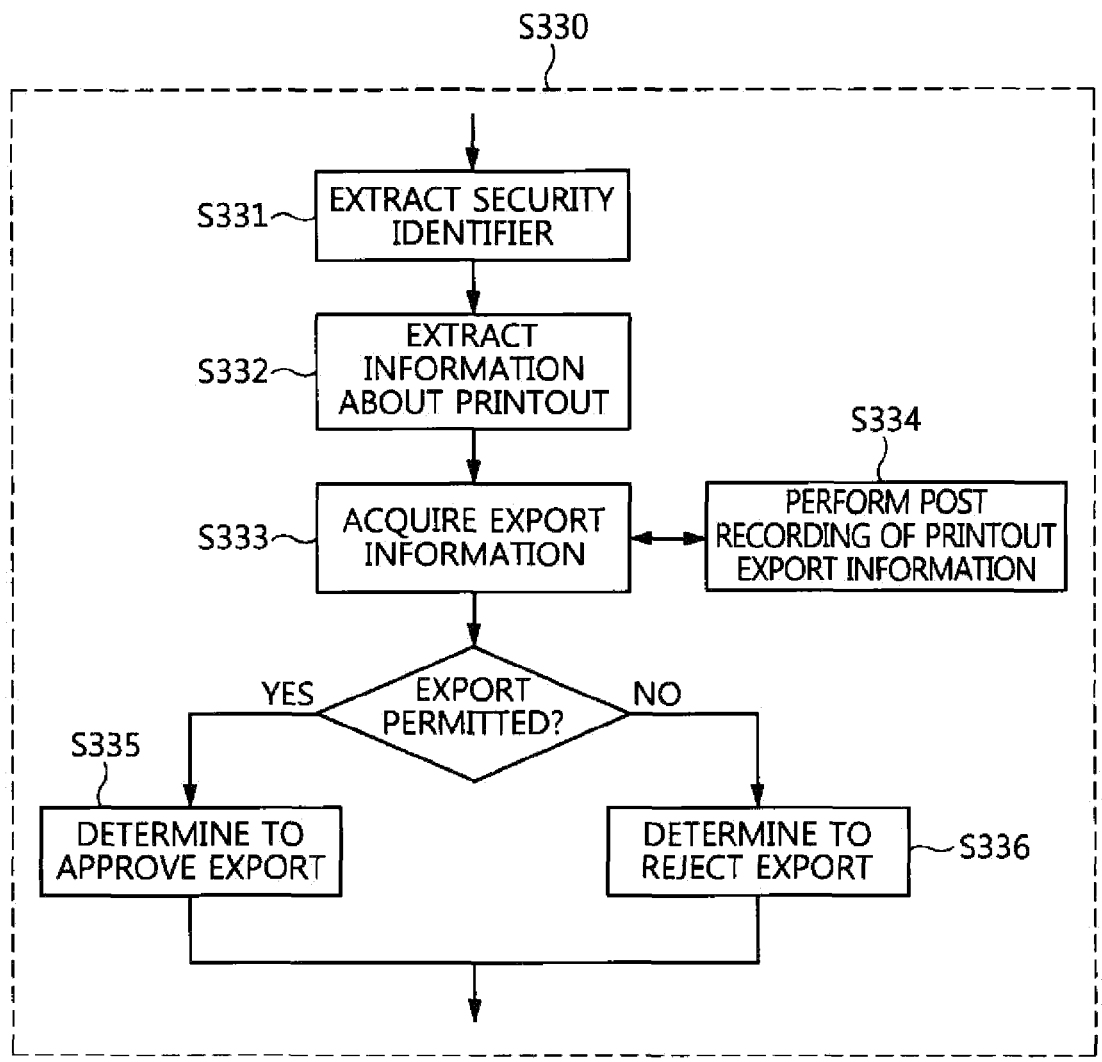
FIG. 13 is a flowchart illustrating security identifier detection step S330 shown in FIG. 12 in detail.

FIG. 13 is a flowchart illustrating the security identifier detection step S330 of FIG. 12 in detail.

At security identifier extraction step S331, only the security identifier is extracted from the content of the printout and the security identifier, and the distortion and errors of the extracted security identifier are corrected.

Thereafter, at printout information extraction step S332, the printout information and the unique value of the electronic document 10 are extracted from the extracted security identifier.

Thereafter, at export information acquisition step S333, the extracted printout information and the unique value of the electronic document 10 are transmitted to the printout export information post recording unit 220 of the export management server 200, and printout export information is acquired from the printout export information post recording unit 220.

Here, the export information is generated by comparing the printout information, stored in the export management server 200, with an export recognition request received from the leakage detection device 400.

Here, at printout export information post recording step S334, the information about the electronic document and the unique value of the electronic document transmitted at export information acquisition step S333 are received, the occurrence/non-occurrence of the attempt of export of the security printout 20 corresponding to the printout information and the unique value is recorded, it is determined whether or not export of the security printout 20 is permitted, and export permission information is transmitted to be used at export information acquisition step S333.

Thereafter, if the export of the printout is permitted at export information acquisition step S333, the approval of export is determined at export approval determination step S335. Here, at export approval determination step S335, a unique warning sound or alarm for notifying the approval of export may be generated.

Further, if the export of the printout is rejected at export information acquisition step S333, the rejection of export is determined at export rejection determination step S336. Here, a unique warning sound or alarm for notifying the rejection of export may be generated at step S336.

According to the present invention, there is an advantage in that it is possible to prevent the non-permitted external export of confidential documents and drawings, which are output, in advance by approving export of a printout, preventing leakage of the printout, and recording relevant information depending on whether or not the external export of the printout is permitted.

Further, according to the present invention, there is another advantage in that it is possible to provide a method, apparatus, and system for generating a security printout by converting the content and information of an electronic document into a security identifier with low perception using a cognitive visual system and outputting the security identifier on paper including a security substance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for preventing leakage of a printout using a security paper, comprising:
   registering, by an export registration device, an information about a printout of an electronic document by generating the information about the printout and transmitting the information about the printout to an export management server;
   outputting, by a security printer, a security printout by printing content of the electronic document and a security identifier of the electronic document on a security paper including a security substance; and
   determining whether or not to export the security printout, by a leakage detection device, by inspecting whether or not the security printout includes the security substance and detecting the security identifier,
   wherein the security identifier comprises security information about the printout of the electronic document,
   wherein the information about the printout of the electronic document includes another information about a unique value allowing the printout to be uniquely distinguished from another printout of the electronic document, wherein the determining whether or not to export the security printout, by the leakage detection device, by inspecting whether or not the security printout includes the security substance and detecting the security identifier comprises:
determining, by the leakage detection device, whether or not the security printout includes the security substance;
generating, by the leakage detection device, an export warning when the security substance is detected;
transmitting, by the leakage detection device, an export recognition request, which includes the information about the printout acquired by detecting the security identifier printed on the security printout and analyzing the detected security identifier, to the export management server;
generating, by the export management server, export information by comparing stored information about the printout with the export recognition request; and
determining, by the leakage detection device, whether or not to export the security printout by receiving and analyzing the export information, and
wherein the security identifier comprises the information about the security printout and the unique value of the electronic document.

2. The method of claim 1, wherein the registering comprises:
generating the unique value allowing the electronic document to be uniquely identified;
transmitting information about the printout including the unique value to the export management server; and
registering, by the export management server, the information about the printout.

3. The method of claim 1, wherein the outputting comprises:
inspecting, by the security printer, whether the security paper including the security substance is provided;
printing the content of the electronic document on the paper including the security substance; and
printing the security identifier of the electronic document on the security paper including the security substance.

4. The method of claim 3, wherein the printing the security identifier of the electronic document on the security paper including the security substance comprises:
calculating the information about the printout of the electronic document and the another information about the unique value allowing the electronic document to be distinguished;
generating the security identifier corresponding to the unique value; and
printing and outputting the security identifier.

5. The method of claim 1, further comprising:
recording, by the export management server, the information about the printout and the another information about the unique value.

6. The method of claim 1, wherein the security paper including the security substance comprises different security substances according to a security level.

7. An apparatus for preventing leakage of a printout using a security paper, comprising:
a processor;
an export registration unit for registering an information about a printout of an electronic document by generating the information about the printout and transmitting the information about the printout to an export management server;
a security printer unit for generating a security printout by printing content of the electronic document and a security identifier of the electronic document using a security paper including a security substance;
the export management server unit for recording and determining whether the security printout is to be exported to outside; and
a leakage detection unit for determining whether or not to export the security printout by detecting the security substance of the security printout, generating an export warning, and analyzing the security identifier,
wherein the security identifier includes security information about the printout of the electronic document,
wherein the information about the printout of the electronic document includes another information about a unique value allowing the printout to be uniquely distinguished from another printout of the electronic document,
wherein the export management server comprises:
a printout export occurrence/non-occurrence previous registration unit for recording the security information about the printout which may be exported to outside by receiving and analyzing the information about the printout and the unique value of the electronic document; and
a printout export information post recording unit for receiving occurrence/non-occurrence of an attempt of export of the security printout from the leakage detection unit, recording the occurrence/non-occurrence of the attempt of the export of the security printout, and generating, recording, and transmitting the export information including information about approval/non-approval of the export of the security printout at a request of the leakage detection unit, and
wherein functions of the printout export occurrence/non-occurrence previous registration unit and the printout export information post recording unit are implemented by the processor.

8. The apparatus of claim 7,
wherein the export registration unit comprises:
a printout unique value calculation unit for calculating and generating the unique value of the electronic document; and
a printout information transmission unit for transmitting the information about the printout of the electronic document and the another information about the unique value of the electronic document to the export management server unit, and
wherein functions of the printout unique value calculation unit and the printout information transmission unit are implemented by the processor.

9. The apparatus of claim 7,
wherein the security printer unit comprises:
a security paper inspection unit for inspecting whether or not the security paper including the security substance is provided;
an electronic document output unit for outputting the content of the electronic document; and
a security identifier insertion unit for printing the security identifier on the security printout, and
wherein functions of the security paper inspection unit, the electronic document output unit and the security identifier insertion unit are implemented by the processor.

10. The apparatus of claim 9,
wherein the security identifier insertion unit comprises:
a printout unique value calculation unit for calculating the unique value of the electronic document by analyzing the electronic document;

a security identifier generation unit for generating the security identifier which includes the unique value and the information about the printout of the electronic document in a form of low perception; and a security identifier output unit for printing the security identifier on the security printout, and wherein functions of the printout unique value calculation unit, the security identifier generation unit and the security identifier output unit are implemented by the processor.

11. The apparatus of claim 7, wherein the leakage detection unit comprises:

a security substance detection unit for detecting the security substance of the security printout; and a security identifier detection unit for detecting and analyzing the security identifier of the security printout, transmitting the security identifier to the export management server unit, and determining whether or not to approve the export of the security printout by analyzing the export information received from the export management server unit, and wherein functions of the security substance detection unit and the security identifier detection unit are implemented by the processor.

12. The apparatus of claim 11, wherein the security identifier detection unit comprises:

a security identifier extraction unit for extracting the security identifier printed on the security printout, and correcting distortion and errors of the extracted security identifier;

a printout information extraction unit for extracting the information about the printout of the electronic document and the another information about the unique value of the electronic document from the extracted security identifier;

an export information acquisition unit for transmitting the information about the printout of the electronic document and the another information about the unique value of the electronic document to the export management unit, and receiving the export information from the export management unit; and an export approval determination unit for analyzing the acquired export information, permitting export when the security printout is permitted to be exported and rejecting export when the printout is not permitted to be exported, and wherein functions of the security identifier extraction unit, the printout information extraction unit, the export information acquisition unit and the export approval determination unit are implemented by the processor.

* * * * *